US00RE51084E

(19) United States
(12) Reissued Patent
Pirtle

(10) Patent Number: US RE51,084 E
(45) **Date of Reissued Patent: *Oct. 20, 2026**

(54) TOOLS FOR RAILWAY TRAFFIC CONTROL

(71) Applicant: RAILWARE, INC., Hauppauge, NY (US)

(72) Inventor: Ross Pirtle, Commack, NY (US)

(73) Assignee: RAILWARE, INC., Hauppauge, NY (US)

( * ) Notice: This patent is subject to a terminal disclaimer.

(21) Appl. No.: 17/750,527

(22) Filed: May 23, 2022

Related U.S. Patent Documents

Reissue of:
(64) Patent No.: 9,403,545
Issued: Aug. 2, 2016
Appl. No.: 14/519,727
Filed: Oct. 21, 2014

U.S. Applications:
(63) Continuation of application No. 16/709,126, filed on Dec. 10, 2019, now Pat. No. Re. 49,115, which is a
(Continued)

(51) Int. Cl.
*B61L 23/06* (2006.01)
*B61L 25/06* (2006.01)
(Continued)

(52) U.S. Cl.
CPC ..... *B61L 27/20* (2022.01); *B61L 23/06* (2013.01); *B61L 25/06* (2013.01); *B61L 27/00* (2013.01); *B61L 25/08* (2013.01)

(58) Field of Classification Search
CPC .. B61L 27/0038; B61L 27/0005; B61L 27/02; B61L 27/00; B61L 23/00;
(Continued)

(56) References Cited

U.S. PATENT DOCUMENTS 2,166,178 A 7/1939 Preston
2,210,224 A 8/1940 Twitchell
(Continued)

FOREIGN PATENT DOCUMENTS

AU 2004215736 B2 9/2004
CN 1139901 C 2/2004
(Continued)

OTHER PUBLICATIONS

Nicholas Oriol et al., "Supporting Railroad Roadway Worker Communications with a Wireless Handheld Computer: vol. 1: Usability for the Roadway Worker", Final Report No. DOT/FRA/ORD-04/13.I, Oct. 2004, US Dept. of Transportation, Federal Railroad Administration, 75 pages. (Year: 2004).*
(Continued)

*Primary Examiner* — Peter C English

(57) ABSTRACT

Tools (such as system, apparatus, methodology, etc.) may be provided to control traffic over a railway track section, when a railway worker is working on or near the track section. [Move] *More* particularly, when traffic over the track section is to be blocked, a release code is generated and sent to an electronic contact address of the railway worker. Traffic through the track section is blocked until the release code is entered in the system.

6 Claims, 11 Drawing Sheets

(Amended)

Related U.S. Application Data continuation of application No. 15/928,955, filed on Mar. 22, 2018, now Pat. No. Re. 47,835, which is an application for the reissue of Pat. No. 9,403,545.

(60) Provisional application No. 61/893,547, filed on Oct. 21, 2013.

(51) Int. Cl.
*B61L 27/00* (2022.01)
*B61L 27/20* (2022.01)
*B61L 25/08* (2006.01)

(58) Field of Classification Search
CPC ..... B61L 23/06; B61L 23/10; B61L 19/06; B61L 2019/065; B61L 25/06; B61L 25/08; B61L 27/20
See application file for complete search history.

(56) References Cited

U.S. PATENT DOCUMENTS 3,836,768 A 9/1974 Clarke et al.
5,390,880 A * 2/1995 Fukawa ..... B61L 27/0027 246/167 R
5,708,422 A 1/1998 Blonder et al.
5,727,758 A * 3/1998 Penza ..... B61L 23/06 246/124
5,924,653 A * 7/1999 Pedersen ..... B61L 3/121 246/14
6,073,101 A 6/2000 Maes
6,078,908 A 6/2000 Schmitz
6,113,037 A * 9/2000 Pace ..... B61L 23/06 246/124
6,145,792 A * 11/2000 Penza ..... B61L 23/06 246/122 R
6,259,909 B1 7/2001 Ratayczak et al.
6,300,873 B1 10/2001 Kucharczyk et al.
6,581,161 B1 * 6/2003 Byford ..... G06F 21/32 713/185
6,615,171 B1 9/2003 Kanevsky et al.
6,615,174 B1 9/2003 Arslan et al.
6,959,233 B2 10/2005 Hungate et al.
6,973,575 B2 12/2005 Arnold
7,140,577 B2 11/2006 Mollet et al.
7,155,358 B2 12/2006 Bamfield et al.
7,260,529 B1 8/2007 Lengen
7,286,987 B2 10/2007 Roy
7,328,090 B2 * 2/2008 Pachl ..... B61L 27/02 701/19
7,457,751 B2 11/2008 Shostak
7,624,952 B1 * 12/2009 Bartek ..... B61L 23/06 246/124
7,689,832 B2 3/2010 Talmor et al.
7,698,029 B2 4/2010 Atmur et al.
8,061,662 B1 * 11/2011 Bartek ..... B61L 3/04 246/203 D
8,065,715 B2 11/2011 Song
8,135,627 B2 3/2012 Shoen et al.
8,280,567 B2 10/2012 Brand et al.
8,406,943 B2 3/2013 Brand et al.
8,423,768 B2 4/2013 Huang et al.
8,437,740 B2 5/2013 Despain et al.
8,478,463 B2 * 7/2013 Knott ..... B61L 3/221 246/167 R
8,482,378 B2 7/2013 Sadighi et al.
8,578,454 B2 11/2013 Grim
8,627,422 B2 1/2014 Hawkes et al.
8,714,494 B2 5/2014 Weber
8,812,227 B2 8/2014 Carlson et al.
8,948,392 B2 2/2015 Chassagne
8,952,805 B2 2/2015 Baines et al.
8,989,926 B2 3/2015 Pretorius et al.
9,087,217 B2 7/2015 Gallois et al.
9,187,105 B2 11/2015 Tamaribuchi et al.
9,434,396 B2 * 9/2016 Seidler et al. ..... H04W 4/42
9,449,445 B2 9/2016 van Willigenburg et al.
9,517,782 B2 12/2016 Pirtle
9,886,586 B2 2/2018 Sieverding
RE47,835 E 2/2020 Pirtle
RE49,115 E 6/2022 Pirtle
2003/0005329 A1 1/2003 Ikonen
2004/0049327 A1 3/2004 Kondratenko et al.
2004/0176884 A1 9/2004 Hungate et al.
2006/0033605 A1 2/2006 Bridge
2006/0041341 A1 2/2006 Kane et al.
2006/0161317 A1 7/2006 Pachl
2007/0055743 A1 * 3/2007 Pirtle ..... H04L 63/08 709/217
2007/0078574 A1 4/2007 Davenport
2007/0176054 A1 * 8/2007 Mally ..... B61L 23/06 246/15
2007/0182595 A1 8/2007 Ghasabian
2008/0288736 A1 11/2008 Lawson et al.
2009/0140856 A1 6/2009 George et al.
2009/0324025 A1 12/2009 Camp, Jr. et al.
2010/0138037 A1 6/2010 Adelberg et al.
2010/0223055 A1 9/2010 Mclean
2011/0006912 A1 * 1/2011 Sheardown ..... B61L 23/06 340/901
2011/0037619 A1 * 2/2011 Ginsberg ..... G08G 1/095 340/910
2011/0226910 A1 * 9/2011 Bock ..... B61L 23/06 246/167 A
2011/0238242 A1 * 9/2011 Nichter ..... B61L 27/0005 701/19
2011/0278401 A1 * 11/2011 Sheardown ..... B61L 23/06 246/167 A
2011/0313596 A1 * 12/2011 Ecton ..... B61L 3/127 701/2
2012/0176217 A1 * 7/2012 Tamaribuchi ..... B61L 23/06 340/5.7
2013/0135109 A1 * 5/2013 Sharon ..... G08B 21/02 340/576
2013/0166114 A1 6/2013 Baines et al.
2013/0168503 A1 7/2013 Cooper et al.
2013/0187010 A1 7/2013 Kim
2013/0201316 A1 8/2013 Binder et al.
2013/0234741 A1 9/2013 Huang
2013/0304286 A1 11/2013 Ehrler et al.
2014/0104081 A1 4/2014 Cross et al.
2014/0250512 A1 9/2014 Goldstone et al.
2014/0346286 A1 11/2014 Tonguz et al.
2015/0108284 A1 4/2015 Pirtle
2015/0251875 A1 9/2015 Lustenberger
2015/0367873 A1 12/2015 Ibendorf et al.
2016/0035507 A1 2/2016 Braband et al.

FOREIGN PATENT DOCUMENTS

CN 101166085 A 4/2008
CN 101722971 A 6/2010
CN 102233887 A 11/2011
CN 102556120 A 7/2012
CN 102799158 A 11/2012
EP 108363 5/1984
EP 108363 A2 5/1984
EP 0286627 A2 10/1988
EP 1308366 A1 5/2003
EP 1396413 A1 3/2004
EP 1308366 B1 3/2006
EP 1674370 A1 6/2006
EP 1674370 B1 4/2008
EP 2527226 A2 11/2012
EP 2390158 B1 4/2013
GB 2344670 A 6/2000
GB 236419 3/2002
GB 2372126 A 8/2002
JP 06-318216 A 11/1994
JP 2001-191921 A 7/2001
JP 2001-233214 A 8/2001
JP 2002-032101 A 1/2002

(56) References Cited

FOREIGN PATENT DOCUMENTS

| | | | | |
|---|---|---|---|---|
| JP | 2002-132881 | A | 5/2002 | |
| JP | 2002-205646 | A | 7/2002 | |
| JP | 2004-196202 | A | 1/2004 | |
| JP | 2004-282814 | A | 10/2004 | |
| JP | 2005-029055 | A | 2/2005 | |
| JP | 3705481 | B2 | 10/2005 | |
| JP | 2006-273265 | A | 10/2006 | |
| JP | 3861066 | B2 | 12/2006 | |
| JP | 2007-069683 | A | 3/2007 | |
| JP | 2009-015608 | A | 1/2009 | |
| JP | 2010-237905 | A | 10/2010 | |
| JP | 2010-274815 | A | 12/2010 | |
| JP | 2011-014008 | A | 1/2011 | |
| JP | 2011-128865 | A | 6/2011 | |
| JP | 4806131 | B2 | 8/2011 | |
| JP | 4783258 | B2 | 9/2011 | |
| JP | 12-118568 | A | 6/2012 | |
| JP | 5102132 | B2 | 10/2012 | |
| JP | 2013-086608 | A | 5/2013 | |
| KR | 2004-0106864 | A | 12/2004 | |
| KR | 2005-0060255 | A | 6/2005 | |
| KR | 2010-0041561 | A | 4/2010 | |
| KR | 10-0968671 | B1 | 7/2010 | |
| KR | 10-1008160 | B1 | 1/2011 | |
| KR | 2012-0057684 | A | 6/2012 | |
| KR | 102012-0057683 | A | 6/2012 | |
| NL | 1030321 | C2 | 1/2012 | |
| WO | WO2004/042663 | A1 | 5/2004 | |
| WO | WO 2004/044670 | A2 | 5/2004 | |
| WO | WO 2004/076258 | A1 | 9/2004 | |
| WO | WO 2005/007481 | A1 | 1/2005 | |
| WO | WO 2005/047074 | A1 | 5/2005 | |
| WO | WO-2007107554 | A1 * | 9/2007 | ..... H04L 63/083 |
| WO | WO 2010/012040 | A1 | 2/2010 | |
| WO | WO 2011/128210 | A1 | 10/2011 | |
| WO | WO 2012/031321 | A1 | 3/2012 | |
| WO | WO 2012/031322 | A1 | 3/2012 | |
| WO | WO 2012/110897 | A2 | 8/2012 | |
| WO | WO 2012/136525 | | 10/2012 | |
| WO | WO 2013/060068 | A1 | 5/2013 | |

OTHER PUBLICATIONS

Timothée Masquelier et al., "Supporting Railroad Roadway Worker Communications with a Wireless Handheld Computer: vol. 2: Impact on Dispatcher Performance", Final Report No. DOT/FRA/ORD-04/13.II, Oct. 2004, US Dept. of Transportation, Federal Railroad Administration, 87 pages. (Year: 2004).*

English translation of WO-2011128210-A1 retrieved from EPO's Espacenet website.*

J.B. Calvert, "Centralized Traffic Control", May 29, 1999, 4 pages.

Frank W. Bryan, "Railroad's traffic control systems", May 1, 2006, 5 pages.

Kyle Mcinnes, "BlackBerry-Based WIC Pager Pilot Program at Children's Hospital", June. 21, 2010, http://www.blackberrycool.com/2010/06/21/blackberry-based-wic-pager-pilot-program-at-childrens-hospital/.

Jai C.S., "Healthcare Communication Interface: WIC Pager, Philips Emergin", October 8, 2010, http://www tmenet.com/channels/alert-notification/articles/107546-healthcare-communication-interface-wic-pager-philips-emerg.htm.

"Fatal Accidents Involving Roadway Workers-In-Charge and Lone Workers", Mar. 9, 2012, Fatality Analysis of Maintenance-of-way Employees and Signalmen (FAMES) Committee, 5 pages.

"Introduction to the FAMES Committee", May 21, 2012, Fatality Analysis of Maintenance-of-way Employees and Signalmen (FAMES) Committee, 9 pages.

Caseyjonz et al., "Centralized traffic control", Wikipedia, Jul. 31, 2013.

Aaron-Tripel et al., "Train dispatcher", Aug. 23, 2013, Wikipedia.

Masaki Katahira et al., "Recent Train Traffic Control Systems", Hitachi, Ltd., 1999, Hitachi Review (Jun. 1999), pp. 153-160.

"SCC Centralized traffic control system for lines and area junctions", Ansaldo STS, Undated, 5 pages.

"How Computers Work", by Ron White, (Que Corporation 1999), pp. 274-275.

Declaration Of Dr. William Michalson, Inter Partes Review No. IPR2023-01179.

Amended Complaint, *Railware, Inc.* v. *National Railroad Passenger Corporation d/b/a/ Amtrak*, 1:22-cv-5013-KPF (Jun. 30, 2022 S.D.N.Y.).

Federal Railroad Administration, Research Reports, (Feb. 2005) https://web.archive.org/web/20050211025837/http://www.fra.dot.gov:80/us/content/412.

Federal Railroad Administration, Research Reports, (Sep. 2006) https://web.archive.org/web/20060922194521/http://www.fra.dot.gov/us/content/412.

Federal Railroad Administration, Research Reports, (Feb. 2008) https://web.archive.org/web/20080212192107/http://www.fra.dot.gov:80/us/content/412.

Federal Railroad Administration, Research Reports, (Mar. 2009) https://web.archive.org/web/20090320043352/http://www.fra.dot.gov/us/content/412.

Field Evaluation Of A Wireless Handheld Computer For Railroad Workers (2009). Neslihan Doran et al.

Nicolas Oriol Hoyos, Design and Evaluation of a Communications Device to Enhance Railroad Worker Safety, Master Thesis, MIT (2000).

Fabio De Felice, et al., *Methodological Approach for Performing Human Reliability and Error Analysis in Railway Transportation System*, Int'l J Eng & Tech, vol. 3(5), pp. 341-353 (2011).

Nusra Noorudheen, et al., *Track Worker Safety: Investigating the Contributing Factors and Technology Solutions*, Conf on Railway Engineering (Brisbane Sep. 2012).

American Public Transportation Association, *Securing Control and Communications Systems in Rail Transit Environments—Part I: Elements, Organization and Risk Assessment/Management*, APTA-SS-CCS-RP-001-10 (Jul. 30, 2010).

American Public Transportation Association, *Securing Control and Communications. Systems in Rail Transit Environments—Part II: Defining a Security Zone Architecture for Rail Transit and Protecting Critical Zones*, APTA-SS-CCS-RP-002-13 (Jun. 28, 2013).

Richard E. Smith, *A Contemporary Look at Saltzer and Schroeder's 1975 Design Principles*, IEEE Computer Society, pp. 20-25 (2012).

Kumar Abhishek, et al., *A Comprehensive Study on Multifactor Authentication Schemes*, Advances in Computing and Information Technology, Proc Second Int'l Conf on Advances in Computing and Inform Tech, vol. 2, pp. 561-568 (Aug. 2013).

Laurens Koot, *Security of mobile TAN on smartphones*, Master Thesis, Radboud University. Nijmegen (The Netherlands, 2012).

Aravindhan Kurunthachalam, et al., *One time Password: A Survey*, Int'l J Emerging Trends in Eng & Dev, vol. 1, Issue 3, pp. 613-623 (2013).

Thomas Weigold, *A Generic Framework for Process Execution and Secure Multi-Party Transaction Authorization*, Ph.D. Thesis, University of Westminster (2010).

National Transportation Safety Board Safety Recommendation, R-13-17 (2013).

Emilie Roth et al., *Communication and Coordination Demands of Railroad Roadway Worker Activities and. Implications for New Technology* (2007).

Tetsuo Takashige, *Signalling Systems for Safe Railway Transport*, Japan Railway & Transport Review 21 (1999).

"Control your PC with these 5 speech recognition programs", PC World (2013) available at https://www.pcworld.com/article/448171/control-your-pc-with-these-5-speech-recognition-programs.html.

"Lumen Vox Automated Speech Recognizer", (2013) available at https://web.archive.org/web/20131006060017/http://www.lumenvox.com/products/speech_engine/.

"Processing Speech Recognition Results With Wit.AI (CMU Sphinx)", (2013) available at https://web.archive.org/web/20131030102047/cmusphinx.sourceforge.net/.

(56) References Cited

OTHER PUBLICATIONS

"Coupling an Automatic Dictation System with a Grammar Checker", Chanod et al., (1992).
IMS Introduces "World's First Hands-and-Eyes Free Email Solution for In-Vehicle Use", (2006) Available at https://www.ai-online.com/2006/08/ims-introduces-worlds-first-hands-and-eyes-free-email-solution-for-in-vehicle-use/.
"Voice-to-Text and Mobile Voice Recognition Blog by Vlingo", (2012) available at https://web.archive.org/web/20120122054409/http://blog.vlingo.com/.
"Positive Train Control Implementation Status, Issues, and Impacts", Federal Railroad Administration, 2012.
"An Examination of the Costs and Business Benefits of Positive Train Control,", 1997.
"Implementation of Positive Train Control Systems", Sep. 1999.
"Approval for Electronic Train Management System (ETMS)", Federal Railroad Administration, 2011.
"Correspondence re Approval for Electronic Train Management System (ETMS)", Federal Railroad Administration, 2011.
"ITCC Overview", Meteorcomm LLC, 2012.
"ITCR 1.0 Functional Product Specification", document Revision 1.0, Meteorcomm LLC, 2012.
"ITCR 1.1 System Architecture Specification", document Revision 4.0, Meteorcomm LLC, 2012.
"Benefits and Costs of Positive Train Control", Federal Railroad Administration, 2004.
"PTC Radio Functional Specification", Meteorcomm LLC, 2012.
"PTC Radio Hardware Specification", Meteorcomm LLC, 2012.
"Radio Network Overview and Network Design Principles", Meteorcomm LLC, 2012.
"Railroad Communications and Train Control", Federal Railroad Administration, 1994.
Federal Rail Safety Improvements Act, Public Law 110-432, 2008.
"Railway Cognitive Radio to Enhance Safety, Security and Performance of Positive Train Control", Federal Railroad Administration, 2013.
"Long Island Rail Road PTC Implementation Plan (PTCIP)", 2010.
"Metro-North Railroad PTC Implementation Plan (PTCIP)", 2010.
"Positive Train Control Operational Concepts Document", 2011.
W.J. Moore Ede, "Advanced Train Control Systems Operating Requirements", Proc Transportation Research Forum, vol. 25, No. 1, pp. 473-478, 1984.
Ronald A. Lindsey, "Analysis of the Opportunities for Wireless Technologies in Passenger and Freight Rail Freight Rail Operations", 2007.
Timothée Masquelier, "Design and Evaluation of a GPS-Aided Communication Device for RR Workers", Thesis, Massachusetts Inst Tech, 2001.
"Employee-In-Charge Portable Remote Terminal—Phases 3 and 4 Summary Report", Federal Railroad Administration, 2016.
Neslihan Iclal Doran, "Evaluation of a Digital Communication Device for Railroad Worker Safety", Thesis, Massachusetts Inst Tech, 2005.
"Positive Train Control Systems", Fed Reg, vol. 75, No. 10, pp. 2598-2722, 2010.
Correspondence by FRA with Marquette Rail LLC regarding Product Safety Plan, Docket No. FRA-2011-0055, 2012.
Yasamin Dadashi, "Fundamental Understanding and Future Guidance for Handheld Computers in the Rail Industry", Thesis, Univ Nottingham, 2009.
M. Hartong et al., "Communications security concerns in communications based train control", Trans on The Build Environment (WIT Press), vol. 88, pp. 693-702, 2006.
Mark W. Hartong, "Secure Communications Based Train Control (CBTC) Operations", Thesis, George Mason Univ, 2009.
"Report of the Railroad Safety Advisory Committee, Implementation of Positive Train Control Systems", Aug. 1999.
"Signal and Train Control", Federal Railroad Administration, 2008.
Transcript for Public Hearing re Product Safety Plan for Railsoft TrackAccess, 2011.
Dacfey Dzung et al., "Security for Industrial Communication Systems", Proc IEEE, vol. 93, No. 6, pp. 1152-1177, 2005.
"Supporting Railroad Roadway Worker Communications with a Wireless Handheld Computer—Usability for the Roadway Worker", Federal Railroad Administration, 2004.
Karl J.N.C. Rich et al., "Development of a Hand-Held Terminal for Use in Possession Management by Railway Trackside Workers", 2002.
"TrackAccess Software Product Safety Plan", Marquette Rail, LLC, 2012.
"Notification of Petition for Approval; Product Safety Plan", Fed Reg, vol. 76, No. 153, p. 48941, 2011.
"Positive Train Control Systems", Fed Reg, vol. 74, No. 138, pp. 35950-36028, 2009.
R.L. Rivest et al., "Q3-Method for Obtaining Digital Signatures and Public-Key Cryptosystems", ACM, 1977.
"Data Encryption Standard (DES)", 1999.
"Escrowed Encryption Standard (EES)", 1994.
"Advanced Encryption Standard (AES)", 2001.
Announcing Approval of Federal Information Processing Standard (FIPS) 197, Advanced Encryption Standard (AES), Fed Reg, vol. 66, No. 235, pp. 63369-63371, 2001.
"Positive Train Control Notice of Public Intent", 2010.
"Railroad Accident Brief, Metro-North Railroad Employee Fatality", 2013.
"TrackAccess Software Product Safety Plan", 2011.
"Marquette Rail PSP—TrackAccess Presentation", 2011.
"Highlights of R&D Activities for PTC Implementation", 2009.
"Signal and Train Control", 2008.
"Employee-In-Chart Portable Remote Terminal Phases 3 and 4 Summary Report", Federal Railroad Administration, 2016.
"NORAC Operating Rules", 2011.
"HipLink Software User Guide", 2013.
"DES Modes of Operation", 1980.
"Fips Pub 81, DES Modes of Operation", 1996.
N. Malsch et al., "Impact of Data Link Technology on Railroad Dispatching Operations", Federal Railroad Administration, DOT/FRA/ORD—Apr. 11, 2004.

* cited by examiner (Amended)
FIGURE 1A
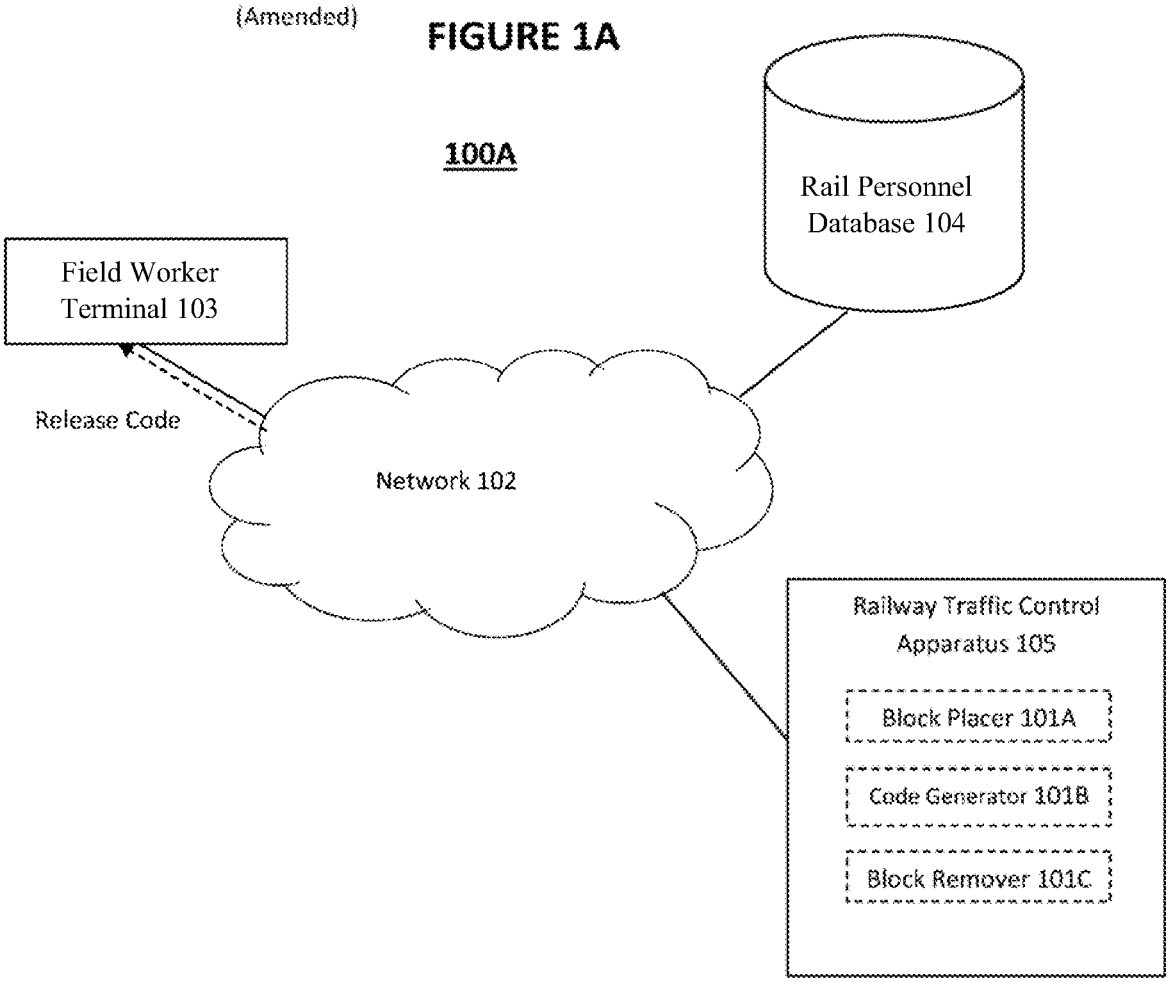

(Amended)
FIGURE 1B
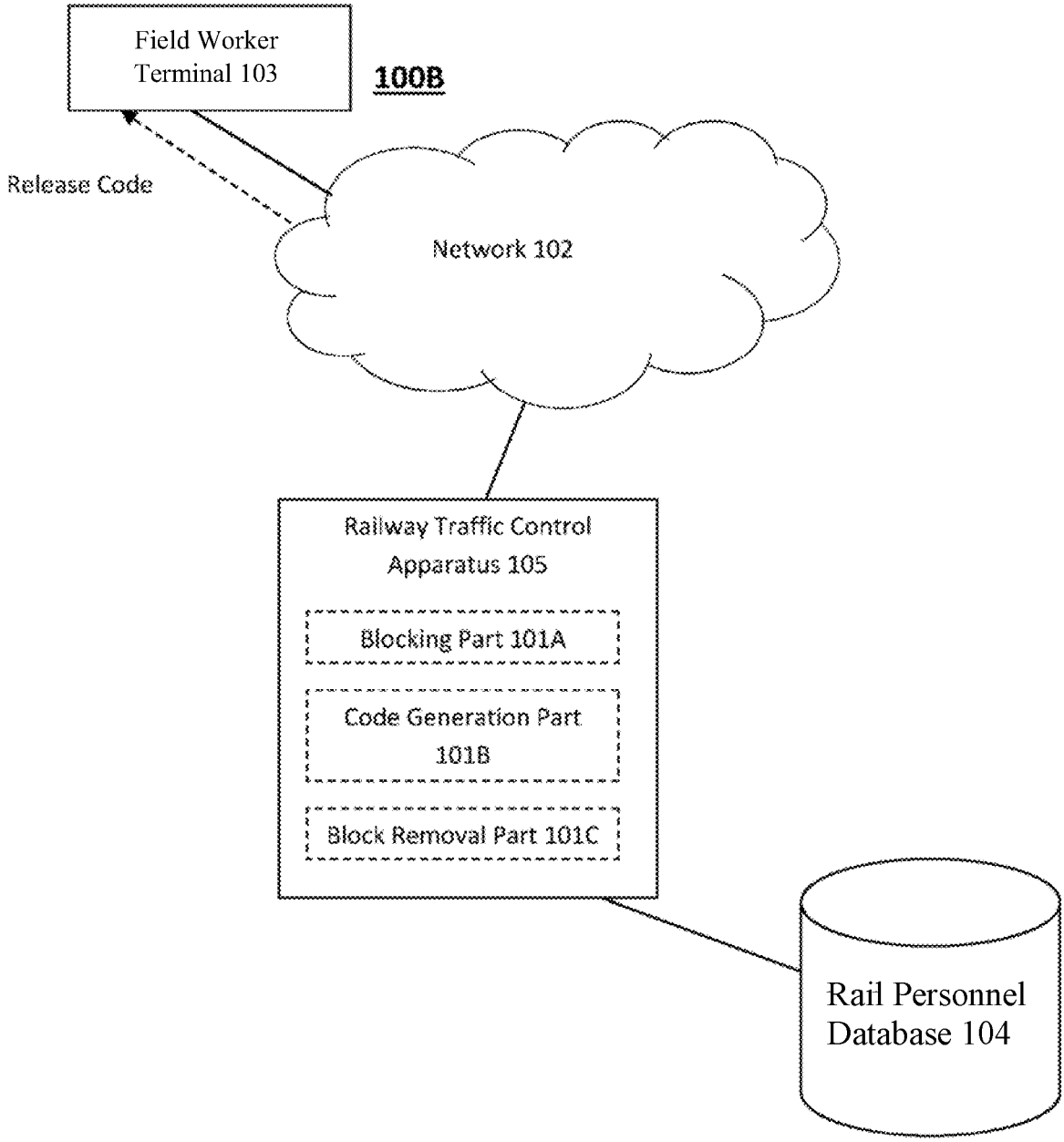

(Amended)
FIGURE 2
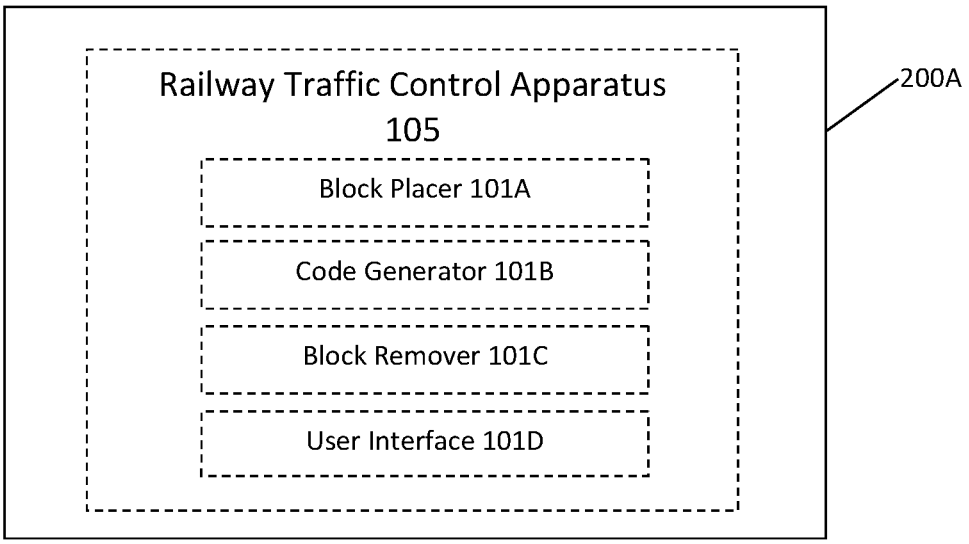

(Amended)
FIGURE 3B
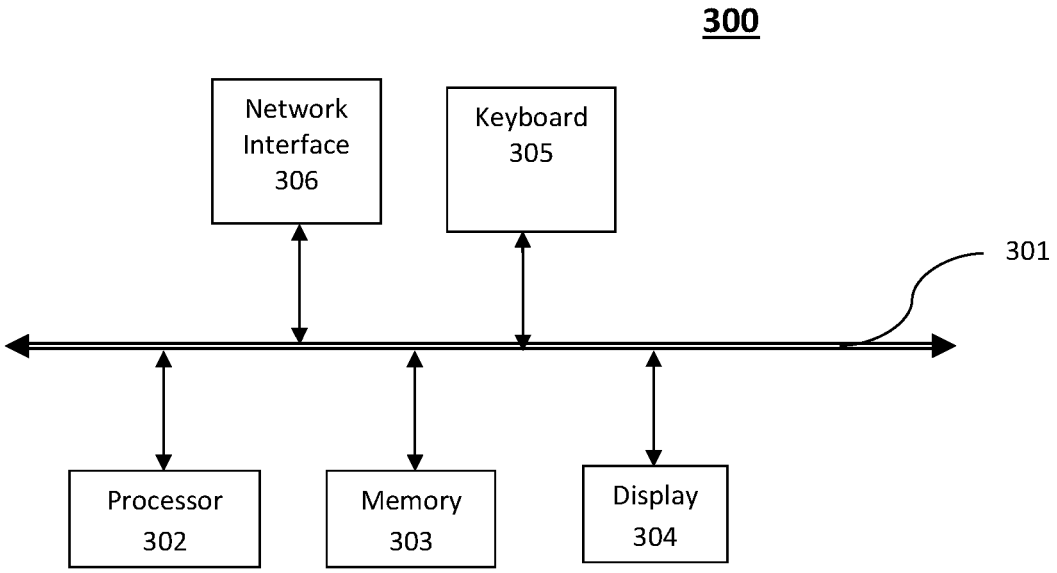

(Amended)
FIGURE 5
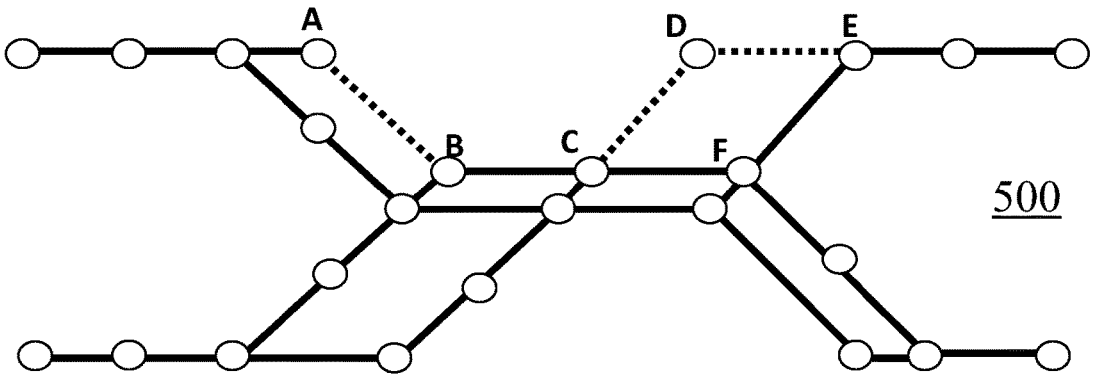

(Amended)
FIGURE 7
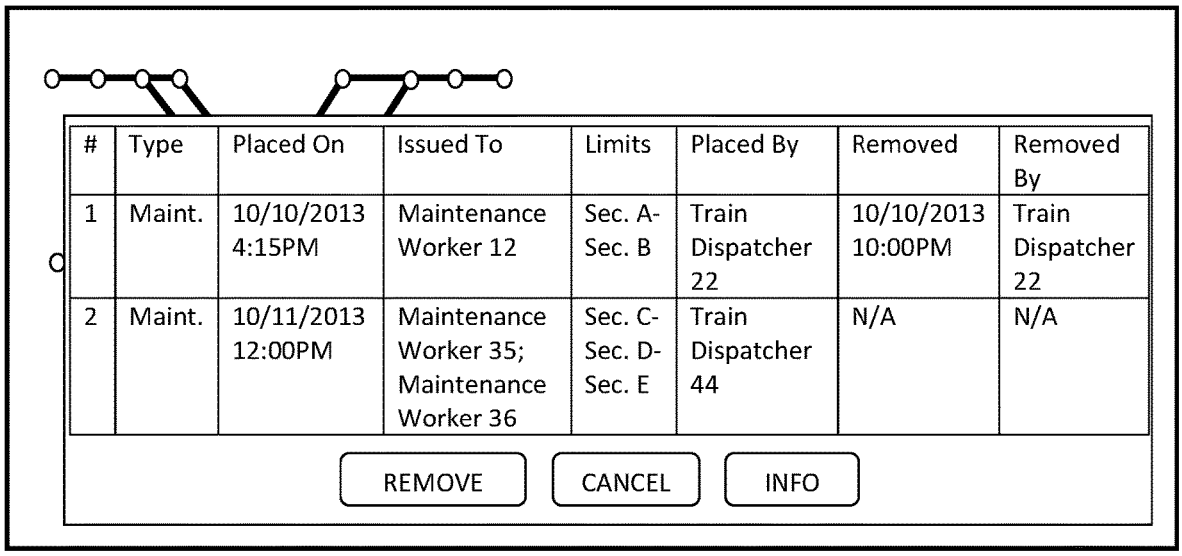
| # | Type | Placed On | Issued To | Limits | Placed By | Removed | Removed By |
|---|---|---|---|---|---|---|---|
| 1 | Maint. | 10/10/2013 4:15PM | Maintenance Worker 12 | Sec. A-Sec. B | Train Dispatcher 22 | 10/10/2013 10:00PM | Train Dispatcher 22 |
| 2 | Maint. | 10/11/2013 12:00PM | Maintenance Worker 35; Maintenance Worker 36 | Sec. C-Sec. D-Sec. E | Train Dispatcher 44 | N/A | N/A |

(Amended)
FIGURE 12
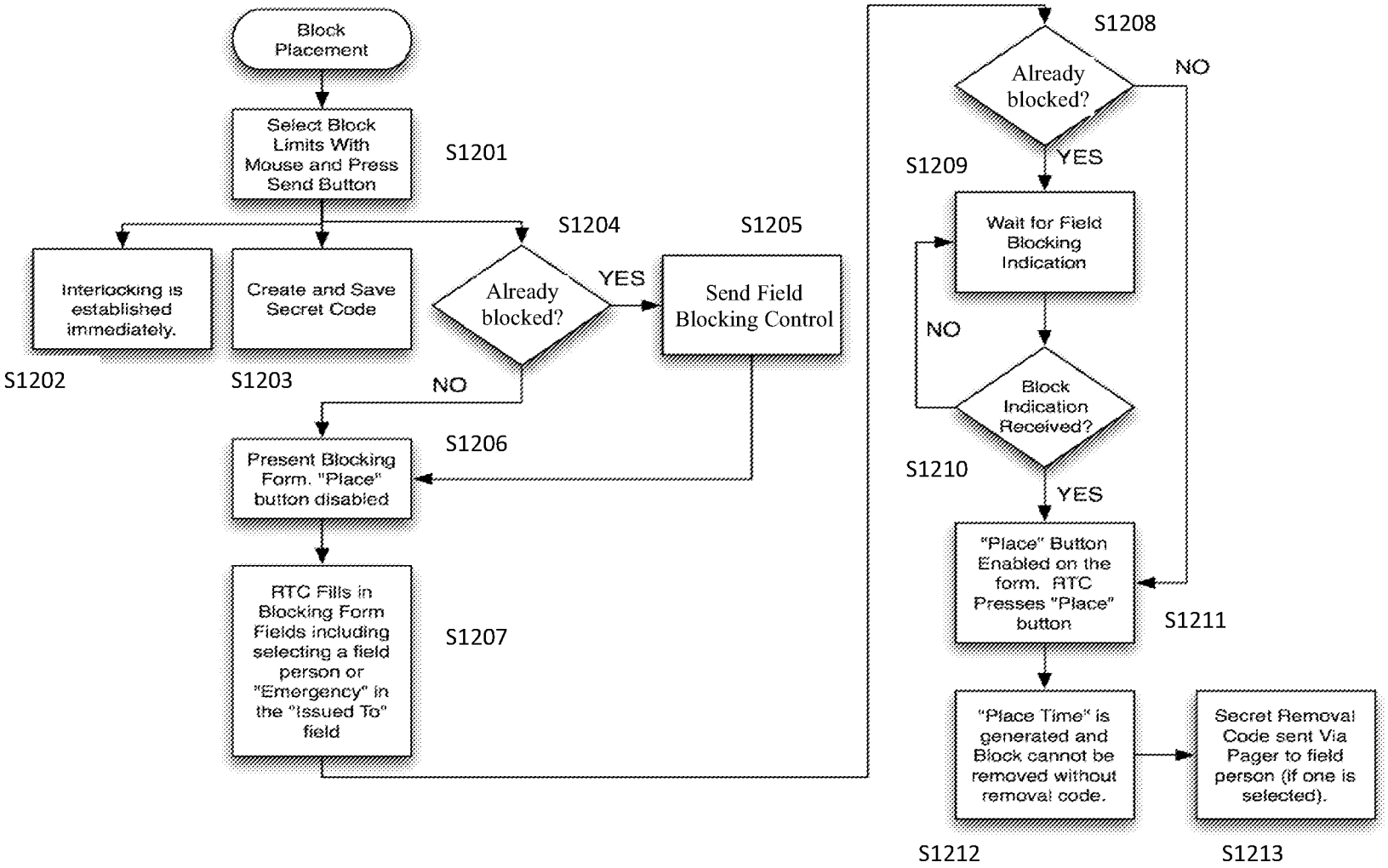

TOOLS FOR RAILWAY TRAFFIC CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

[This application] *Notice: The following multiple reissue applications have been filed for reissue of U.S. Pat. No. 9,403,545:*

(*1*) *Reissue application No. 15/928,955 filed on Mar. 22, 2018 and reissued as U.S. Reissue Pat. No. RE47,835;*

(*2*) *Reissue application Ser. No. 16/709,126, filed on Dec. 10, 2019 and reissued as U.S. Reissue Pat. No. RE49,115, which is a reissue continuation of Reissue application No. 15/928,955;*

(*3*) *This Reissue Application, which is a reissue continuation of Reissue application No. 16/709,126.*

*U.S. Pat. No. 9,403,545* claims the benefit of U.S. Provisional Application No. 61/893,547, filed Oct. 21, 2013 and entitled "SYSTEM, APPARATUS AND METHOD FOR RAILWAY TRAFFIC CONTROL".

TECHNICAL FIELD

This disclosure relates to railway traffic control, and more specifically, a system, apparatus, and method for railway traffic control to address concerns for safety of railway workers working on or near railroad tracks.

BACKGROUND

Railway transportation is run under strict operational guidelines or rules, in order to operate safely. Most of these guidelines are standard amongst commercial railway traffic. Examples of transport standards include interlock signals, centralized traffic control (CTC), rule 251, etc.

Interlocking signals govern movement within a sector controlled by an interlock. For example, on a specific track line, a track may be divided into sections of 400 to 2500 m, on each of which trains move at a speed depending on an interlocking signal exhibited by an interlock at an entrance to the section. That is, the interlocking signal displays a color system which instructs the conductor of the train, or the train operating by automated response, how to move through the upcoming section of track. Interlocking systems usually incorporate a 3-color system by which the train, or train conductor, is informed to proceed at regular speed, is informed to proceed at a reduced speed or is prohibited from proceeding through the upcoming section.

While interlocking systems can be operated manually, currently most interlocking systems are controlled electronically. One method of controlling all of the interlocks within a rail system is through a centralized traffic control (CTC), or traffic control system (TCS). A CTC is used for monitoring, tracking and operating trains traversing tracks throughout a network. The CTC is controlled by a single person known as a train dispatcher.

In order for the train dispatcher to make appropriate train control decisions regarding how the train should be operated, various information and data must be obtained and presented. Information regarding track conditions, train traffic, scheduling, etc., are presented on a control console which may include a map of the entire rail system controlled by the CTC. Through the control console, the dispatcher has control of each interlock signal (that is, the dispatcher controls the train traffic and flow of train traffic using the interlocks) and is constantly made aware of the positions of trains in the railway system as such positions are electronically reported by signals present throughout the railway system. In addition, in order to provide for safe traffic control and avoid accidents or collisions, signals are provided throughout the track network, or interlocks.

The interlocks may be controlled from the CTC in any of various different ways, including, e.g., direct wiring, by pulse codes sent over a wire to distant locations, etc. In addition, interlocks can also be controlled by a native mechanism detecting presence of a train on the track. That is, when a train occupies a certain section of track, the interlock prevents other trains from proceeding onto the same Further, there are additional safety systems on the train itself, such as automatic train control (ATC). A common feature of many of such automated train control systems is the need for constant or nearly constant communications between onboard train control systems and an offboard hub radio connected to control equipment located along the wayside or in a central office. In some systems, the offboard control equipment generates movement authorities which authorize the train to move in one or more sections of track. In some systems, the offboard equipment informs the onboard train control system of the presence of other trains in the vicinity. In yet other systems, the offboard equipment provides information such as temporary speed restrictions and work zone information to the onboard train control system. Such systems protect against a number of human errors on the part of the train drivers, one of the basics of the system being that the train is provided with a computer which receives traffic information, such as stop signals and speed limits, from a plurality of transmitters along the track. Thus, the computer may bring the train to a standstill regardless of what the train driver does when the train arrives at a stop signal.

Even with all these safety features present in a railway system, railway accidents occur, with many being fatal. For example, one study reported that there were 39 roadway worker accidents that occurred between January 1997 and the end of 2011, in which 41 roadway workers perished while attending to tasks such as inspection, construction, maintenance, or repair of railroad track, bridges, roadway, signal and communication systems, electric traction systems, roadway facilities or roadway maintenance machinery on or near track, operating as flagmen or watchmen/lookouts for other roadway workers, etc.

There remains a need for further safety measures to protect the lives of railway workers.

BRIEF SUMMARY

This disclosure provides tools (in the form of systems, apparatuses, methodologies, etc.) for enhancing railway traffic control, as supplemental measures directed to safety of railway workers.

For example, a centralized railway control system may be adapted (such as via computer hardware, software, or a combination) to include providing on a user terminal a user interface including a block placing part to place a block on one or more specified track sections to permit a railway field worker to enter the track sections while blocking railway traffic to said track sections, generating a removal code and transmitting the removal code to the electronic contact address of the railway field worker, and permitting the block to the track sections to be removed only upon entry of the removal code in the centralized railway control system. Such process may be largely automated via programming such that upon placement, by the block placing part, of the block of railway traffic to the specified track sections, the removal code is automatically transmitted, by a code generation part, to the electronic contact address of the railway field worker, and the block of railway traffic to the specified track sections remains in place in the centralized railway control system until the entry of the removal code in the centralized railway control system to cause a block removal part to remove the block on said one or more track sections.

In another aspect, the adaptation may include a RTC user interface to permit a user (e.g., *railway traffic controller RTC or* train dispatcher) to specify a track section(s) to be blocked, specify an instruction to the centralized railway control system to block the railway traffic to the specified track section(s), and specify identifying information of the railway field worker performing (or to be performing) work in the specified track section(s).

In another aspect, the adaptation includes a block removal user interface to permit a user to enter the removal code to cause the block removal part to remove the block on said one or more track sections. Such block removal user interface may be provided in any of various ways. For example, the block removal user interface may be provided within a mobile application or web page through which the railway field worker can enter the removal code manually or orally (i.e. including a voice or speech interface part). As another example, the removal code may be embedded in a link in a message transmitted by email or messaging to the electronic contact address of the railway field worker, and the railway field worker can simply cause the removal code to be entered by activating the link in the message received by the railway field worker. In another example, the block removal user interface may be provided on the same user terminal on which the block placing part is disposed. Further, a voice or speech interface part may be disposed on the system-side to process a voice message (such as received via a telephone call from *terminal 103 of* the railway field worker), extract the removal code from the voice message, and enter the block removal code. In each instance, the block of railway traffic to the specified track sections remains in place in the centralized railway control system until the entry of the removal code through the block removal user interface. Further, entry of the removal code may also require entry of identification of the user entering the removal code, and removal of the block may also require not only the removal code but also confirmation that the user entering the removal code is authorized to remove the block. The block removal user interface may further require, in addition to entry of the removal code, the user to specify that confirmation that the track sections have been cleared has been obtained from the railway field worker associated with the block, before the block removal user interface permits the removal code to be transmitted to the block removal part.

In another aspect, the system may include a railway control database registering block identifying information, including block limits identifying the one or more blocked track sections, along with the removal code for removing the block of the track sections. Further, the railway control database may register additional information, such as identification of the user who specified the instruction to block the track sections, notes specifying reasons for the block, date and time at which the block was placed, etc. The railway control database may further register block removal information identifying date and time at which the block was removed and identifying the user who entered the removal code and who specified that confirmation that the track sections have been cleared was obtained from the railway field worker associated with the block.

BRIEF DESCRIPTION OF THE DRAWINGS

The aforementioned and other aspects, features and advantages can be more readily understood from the following detailed description with reference to the accompanying drawings wherein:

FIG. 1A shows a block diagram illustrating a railway control system, in accordance with an exemplary embodiment;

FIG. 1B shows a block diagram illustrating a railway control system, in accordance with another exemplary embodiment;

FIG. 2 shows a block diagram of *a computer configured by program execution to be or to include* a railway traffic control apparatus, in accordance with an exemplary embodiment;

FIG. 3B shows a block diagram of an exemplary configuration of a computing device;

FIG. 5 shows an example of a graphical portrayal of a railway network;

FIGS. 6-9 show examples of a user interface display, in accordance with an exemplary embodiment;

FIG. 12 shows a flow chart illustrating a block placement method, in accordance with an exemplary embodiment;

DETAILED DESCRIPTION

Figure 3A:
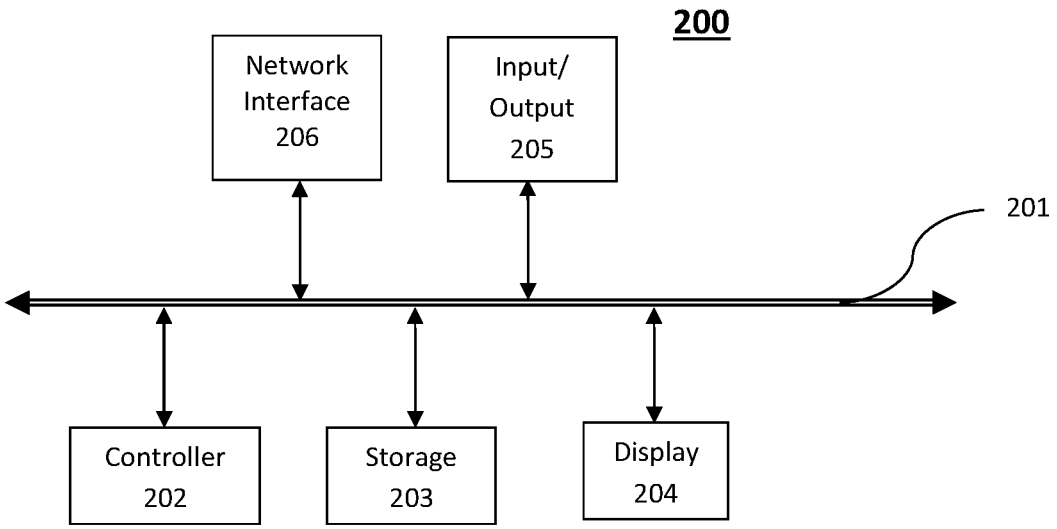
FIG. 3A shows a block diagram of an exemplary configuration of a terminal.

This patent specification describes tools (in the form of methods, apparatuses and systems) that controls train traffic within a railway system using, but not limited to, standardized rules or timetables described in the Background section of this specification.

In describing exemplary embodiments illustrated in the drawings, specific terminology is employed for the sake of clarity. However, the subject matter of this patent specification is not intended to be limited to the specific terminology so selected and it is to be understood that each specific element includes all technical equivalents that operate in a similar manner.

The drawings show examples of implementations of the subject matter of this patent disclosure in several computing environments. However, it should be understood that the subject matter of this disclosure can be utilized by any computing device including but not limited to PDAs, (*personal digital assistants*), cell phones, personal, notebook and workstation computers, kiosks, other information terminals,

[WIC (or another)] pager, etc. In addition, the subject matter of this disclosure might be provided as services in a modular fashion by other devices connected by a communication network.

Referring now to the drawings, wherein like reference numerals designate identical or corresponding parts throughout the several views, there is described tools (systems, apparatuses, methodologies, computer program products, etc.) that can be integrated in a railway traffic control system.

FIG. 1A shows schematically an exemplary embodiment in which a system 100A includes a railway traffic control [terminal] *apparatus* 105, rail personnel data 104 and a terminal 103, each connected to the network 102. FIG. 1B shows schematically another exemplary embodiment, in which rail personnel contact data 104 is accessed directly by the railway traffic control apparatus 105. While only one terminal is connected to the network 102 in the example shown in FIG. 1A as well as in the example shown in FIG. 1B, it should be appreciated that the network environment can have an arbitrary number of devices (of various types).

The network 102 can be any data network, a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 102. In addition, the network 102 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The rail personnel 104 is a database that can be either connected to or inside the railway traffic control [terminal] *apparatus* 105. The rail personnel contact data 104 stores information regarding the maintenance workers used for traveling, inspecting and working on blocked rails. For example, the information stored can include *the* name of the maintenance worker, primary contact, secondary contact, previous assignment, current assignment, etc., as shown via user interface display in FIG. 11.

FIG. 2 shows a [terminal 100A] *computer 200A* which is configured (such as via one or more programs of instructions executable by a processor) [of a computer or another electronic device) with] *to be* a railway traffic blocking apparatus [101 to include] *105 including* a block placer 101A, a code generator 101B, a block remover 101C and a user interface 101D. The [terminal 100A] *computer 200A* can be any electronic device including a processor, storage and display, such as shown by way of examples in FIGS. 3A and 3B.

The railway traffic blocking apparatus is programmed to control the traffic of an entire railway network. The block placer 101A is configured to stop traffic within a certain length of rail line. That is, once a block is placed, no train can traverse the blocked section of rail. For example, in the case of a railway controlled by multiple interlocks, the block placer 101A causes those interlocks to output a STOP signal, therefore, stopping any train traffic within the rails controlled by that interlock. By doing this, maintenance workers and railway personnel can travel, inspect and work on the rails without the danger of oncoming train traffic. Trains that are scheduled to traverse said blocked tracks either come to a complete stop, electronically or mechanically, before passing the interlock or are rerouted using tracks that are not in a blocked state. However, this disclosure is not limited to a railway traffic control system implementing interlocks. This system can be implemented on any configuration in which there is control of the traffic of a railway system.

The code generator 101B is configured to produce a removal or release code, such as a cipher which is random, [pseudo-random,] secret, etc., and stored on the [terminal] *computer*. A new random cipher may be generated for each instance of traffic blocking. This removal or release code is then sent to [another terminal] *terminals* belonging to the railway personnel who are scheduled to travel, inspect or work on the specific rails being blocked.

The block remover 101C is programmed to remove the previous block, or plurality of blocks set by the block placer 101A. The block remover 101C is dependent on the code produced by the code generator 101B. As described in detail below, a block cannot be removed without the input of the removal or release code.

The user interface 101D is configured preferably for the ease of use for the railway traffic controller (*RTC*). As shown by way of examples in FIGS. 6-9 and 11, the user interface 101D displays information and tools needed to enable/disable blocks on rail sections.

The user interface 101D may be a mobile application, a web page or some other software component, on a [terminal] *computer* (*such as a mobile* device). Such [terminal] *device* preferably is configured to communicate through a computer or data network to obtain content and data from an external source. However, it should be appreciated that the inventive aspects described herein can be employed even if the [mobile] device is not configured to connect to a data network, and/or is not connected to a data network.

An example of a configuration of a user terminal (e.g., the terminal 103) or computer is shown schematically in FIG. 3A. In the example of FIG. 3A, terminal device 200 includes a controller (or processor) 202 that communicates with a number of other components, including storage 203, display 204, input/output (such as mouse, touchpad, stylus, microphone and/or speaker with voice/speech interface and/or recognition software, etc.) 205 and a network interface 206, by way of an internal bus 201.

The storage 203 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 206 provides a connection (for example, by way of an Ethernet connection or other network connection which supports any desired network protocol such as, but not limited to TCP/IP, IPX (*Internetwork Packet Exchange*), IPX/SPX (*Internetwork Packet Exchange/Sequenced Packet Exchange*), or NetBEUI) (*NetBIOS Extended User Interface*) to a network (e.g., network 102) to enable the terminal device to communicate with another device through the network.

FIG. 3B shows an exemplary constitution of a computer 300 which can be configured by appropriate programming to operate as the railway traffic control apparatus 105 (FIG. 1A). The computer 300 shown in FIG. 3B includes a processor 302, and various elements connected to the processor 302 by an internal bus 301, such as a memory 303, display 304, keyboard 305 and network interface 306. The processor 302 processes incoming requests transmitted through the network interface 306. The network interface 306 enables the railway traffic control terminal to communicate with other network-connected devices such as a terminal (e.g., the terminal 103 of FIG. 1A or FIG. 1B) and receive data or service requests.

Figure 4:
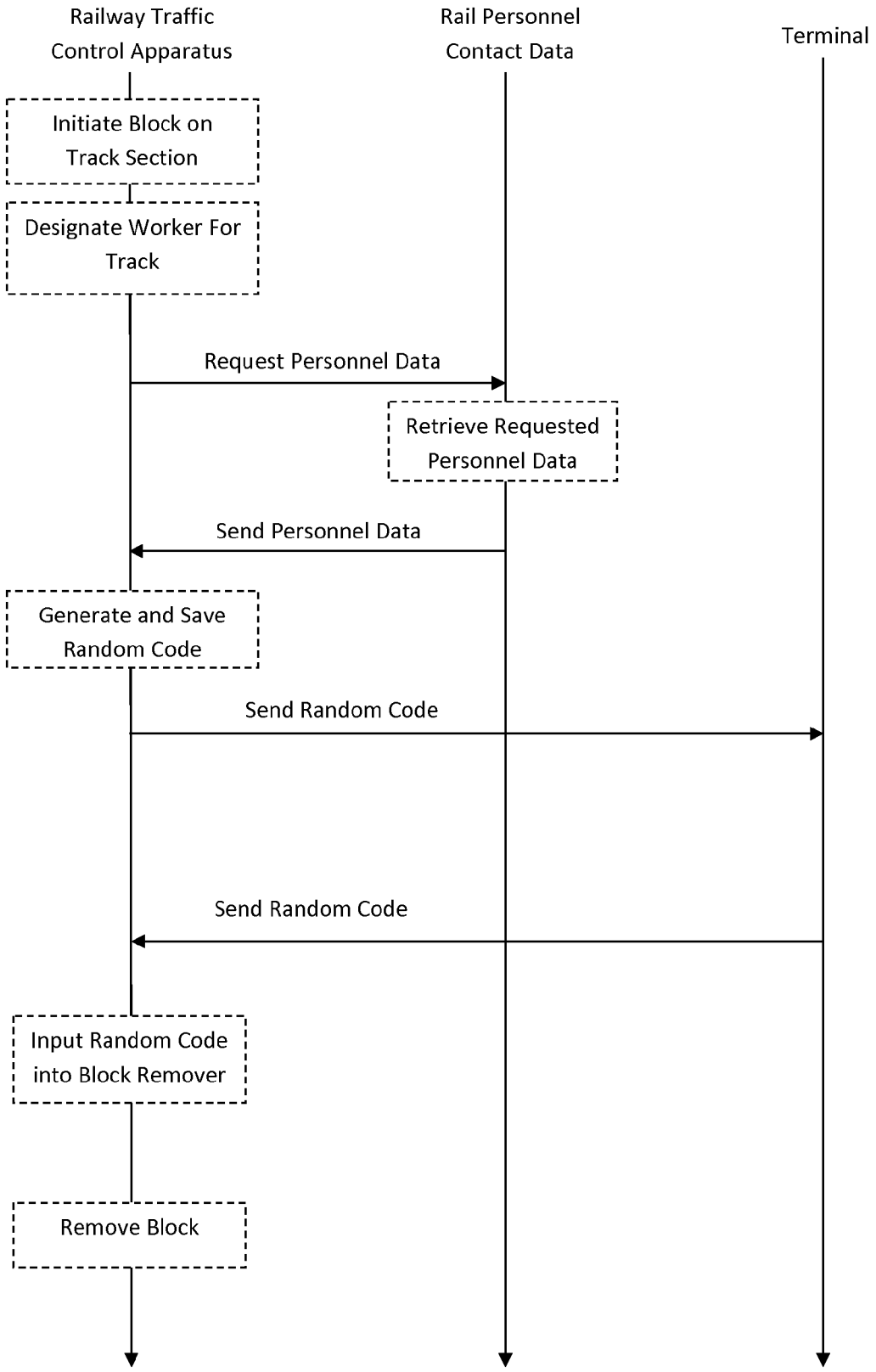
FIG. 4 shows a schematic diagram illustrating communication flow in the system shown in FIG. 1A or in the system shown in FIG. 1B.

Each of the terminal 103, rail personnel database 104 and railway traffic control apparatus 105 can be configured to communicate with each other through the network 102. The railway traffic control [terminal] *apparatus* 105 can be configured to request data from the rail personnel contact data 104 through the network 102, as shown in FIG. 4. When the railway traffic control apparatus 105 initiates a block on a track section, the railway traffic control apparatus 105 may also designate a worker in [associate] *association* with the block on the track section. With this information, the railway traffic control apparatus 105 requests the specific personnel data pertaining to the designated worker. The rail personnel contact data retrieves the requested personnel data and sends it to the railway traffic control apparatus 105. By receiving this data, the railway traffic control apparatus 105 may then generate a release code and save it to an internal storage.

The release code is then sent to the terminal [102] *103*. This terminal [102] *103* is the contact associated with the designated worker, and the electronic address of this terminal is found within the personnel data received from the rail personnel contact data 104. By this system, only the railway traffic control apparatus 105 and terminal [102] *103* receive the release code generated by the railway traffic control apparatus 105.

Additionally, FIG. 4 shows the communication between the terminal [102] *103* and the railway traffic control apparatus 105 in the event that a block on a certain track is to be lifted. In order for a block on a certain track to be lifted, the release code has to be input into the railway traffic control apparatus. The terminal [102] *103* sends the release code to the railway traffic control apparatus 105. The release code is then input into the block remover 101C. After which, the block is removed and traffic to that section of rail is then allowed.

FIG. 5 illustrates an example of a railway network 500. Labeled are interlocks A-F which control sections of railway of the railway network 500. For example, the rail traffic controller (*RTC*) might choose to block the section of rail corresponding to the track between interlock A and interlock B. This way, train traffic between those two interlocks in prohibited. The railway network is present on screen of the railway traffic control [terminal] *apparatus* 105 at all times for the convenience of the rail traffic controller. By being on screen at all times, the rail traffic controller knows the status of certain sections of rail in real time.

As shown in the example illustrated in FIG. 5, the railway between interlocks A and B, and interlocks C, D and E is blocked. Train traffic is prohibited between these sections and shown to the railway traffic controller on screen. As further explained below, the railway traffic controller can lift the blocks on these sections of track if the release code is input into the railway traffic control [terminal] *apparatus* 105.

Figure 6:
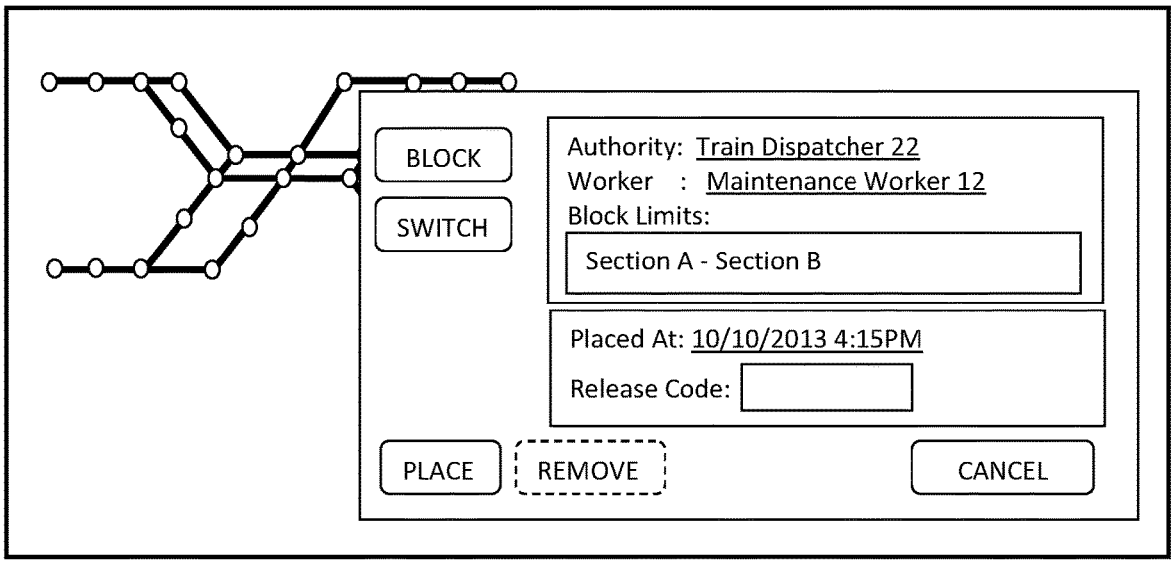

FIG. 6 is an exemplary illustration of the user interface of the railway traffic control [terminal] *apparatus* 105. The railway traffic controller (*RTC*) may place blocks on any section of traffic using this user interface. In this exemplary embodiment, the train traffic controller inputs authority, worker and block limits. This information corresponds to the train traffic controller username, maintenance worker designated to work on the specific blocked track and the sections of track being blocked, respectively. In addition, the railway traffic control [terminal] *apparatus* 105 then timestamps the order once the block is placed.

Once the block is put into place, the corresponding section on the railway network 500 displays the section of track being blocked. In addition, the railway traffic control [terminal] *apparatus* 105 generates a release code, stores the release code, and sends the code to the maintenance worker designated for track work, i.e. maintenance worker 12. As shown in FIG. 6, the railway traffic controller may place blocks on track sections but may not remove the track blocks without the input of the release code in the allotted area labeled release code. FIG. 6 shows that the remove action is dashed out, meaning it cannot be selected (unless a release code is first entered). In the example illustrated in FIG. 6, it is shown that only one worker, maintenance worker 12 is designated to work on track Section A to Section B. However, as shown in later embodiments, the train traffic controller is not limited to the amount of maintenance workers designated for any track section. In addition, the train traffic controller may apply a block to any number of additional track sections.

The blocks are then tabulated by the railway traffic control apparatus 105 as depicted in FIG. 7. The table in FIG. 7 lists all the blocks that are in place and in addition lists blocks that were previously set. The information that can be found in this table includes, but is not limited to, the type of work being done on the track sections, when the block was placed, who is designated to work on the sections of track, who placed the block, when was the block removed and who removed the block.

Additional information can be accessed though this table by highlighting a cell of the table and selecting info, as shown in FIG. 7. For example, by highlighting the cell labeled maintenance worker 12 and selecting info, the train traffic controller may access the bio of the maintenance worker 12, as shown in detail below. The train traffic controller may also highlight a different cell, such as the limits cell label "Sec. A-Sec. B". By selecting this cell and selecting the info command, the past history of maintenance work and operation of the section(s) may be displayed to the train traffic controller.

Figure 8:
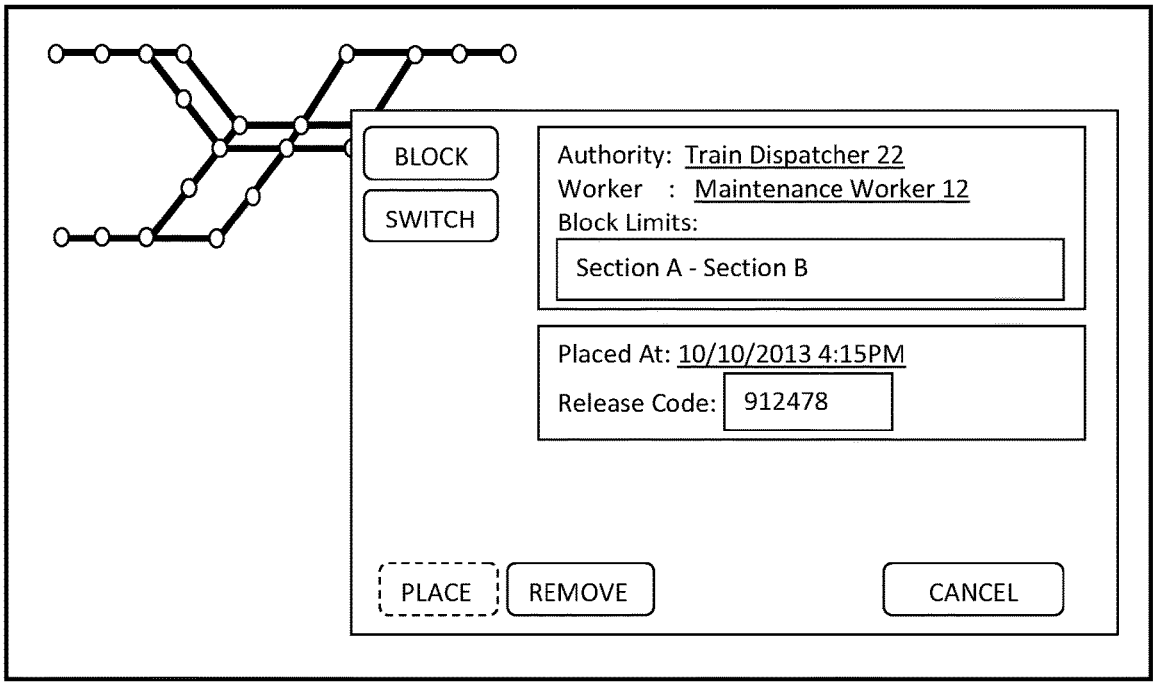

FIG. 8 shows the user interface of the railway traffic control [terminal] *apparatus* 105 as the railway traffic controller inputs the release code to remove the block on certain track sections. In the exemplary embodiment of FIG. 8, the remove option is now able to be selected with the input of the release code provided by the designated worker assigned for track work, maintenance worker 12.

Without the input of the release code, the remove option is not available to be selected. In a different embodiment, the release code may be obtained from the storage of the railway traffic control [terminal] *apparatus* 105.

In the case where there are multiple maintenance workers assigned to a certain track section, there may be provided one release code to one, multiple or all of the maintenance workers assigned. That is, [The] *the* train traffic controller may input that the release code be specified to one maintenance worker, preferably a supervisor or foreman, to multiple maintenance workers or to all of the maintenance workers assigned to work on a given track section. Also, in another embodiment, in a case where there are multiple workers assigned for a certain track section, there may be provided multiple unique release codes which would then all be required to be input into the train traffic control [terminal]

*apparatus* 105 by the train traffic controller in order to be able to remove blocks on certain track sections.

Figure 9:
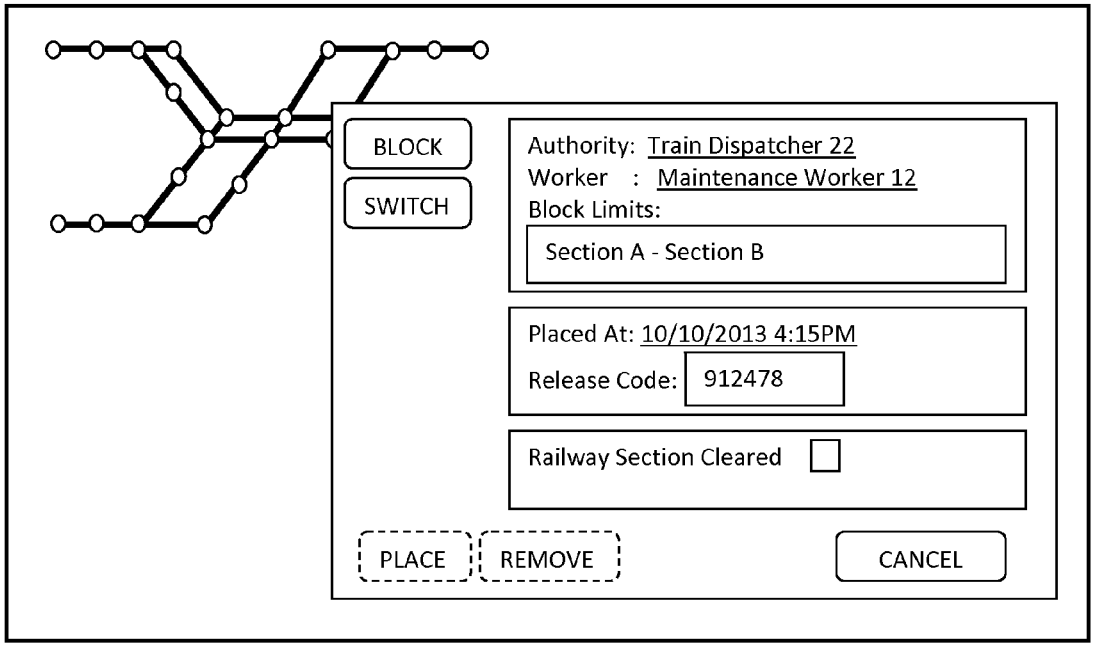

In another embodiment, the train traffic controller may be asked to verify that a railway section is cleared before receiving the option to remove a train block. As shown in FIG. 9, the user interface displayed by the railway traffic control [terminal] *apparatus* 105 does not allow a removal of a block until the option corresponding to "Railway Section Cleared" is checked. This option allows for a further protection of the maintenance workers assigned to the block track sections.

Figure 10:
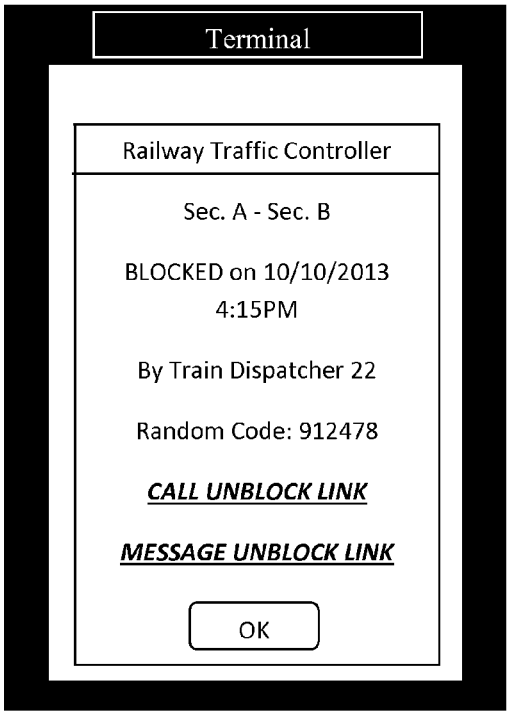
FIG. 10 shows an example of a user interface display that may be provided on the field worker side for triggering block removal.

FIG. 10 shows an exemplary illustration of a message sent by the railway traffic control [terminal] *apparatus* 105 to a terminal 103 at a corresponding address of a maintenance worker assigned to work on a blocked track. The message is meant to deliver the release code to the maintenance worker assigned to work on a blocked track. In addition to relaying the code, the message may include, but not limited to, information regarding the section of track that is being blocked, the date and time that the track was blocked, who initiated the track block, and links to quickly respond to the message. By selecting one of the links embedded in the message, the terminal 103 sends the release code to the railway traffic control [terminal] *apparatus* 105. The code can be transmitted through, but not limited to, text message, e-mail or voice message. In the present embodiment being illustrated, the terminal 103 is depicted as a mobile phone. The terminal 103 could be any communication device such as, but not limited to, mobile phone or smartphone, tablet, [WIC (or another)] pager, PDA, etc.

In another embodiment, once the rail traffic controller unblocks a section of track, the railway traffic control [terminal] *apparatus* 105 may send a message to the worker, or plurality of workers, associated with working on the previously blocked track in order to inform them that the track has been unblocked and is no longer a safe environment to work in.

Figure 11:
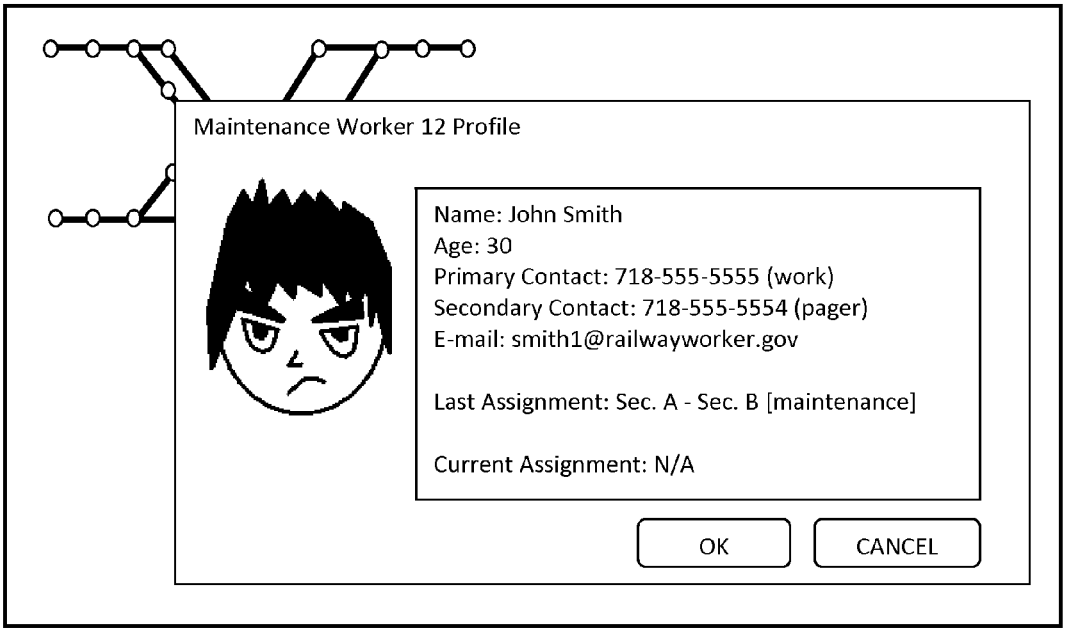
FIG. 11 shows another example of a user interface display.

FIG. 11 depicts an exemplary embodiment of a profile of a maintenance worker. This profile may be accessed directly by highlighting the corresponding maintenance worker cell in the table depicted in FIG. 7 and selecting the info tab. This command brings up the profile and the maintenance worker and displays information regarding the worker including, but not limited to, the name, age, primary contact, secondary contact, e-mail, last assignment and current assignment of the maintenance worker. Additionally in this screen, the railway traffic controller may contact the maintenance worker directly using one of the plurality of addresses provided.

Next, the method of placing a block on a track section will be described with reference to FIG. 12. In S1201, the rail traffic controller selects the sections to be blocked using the railway traffic control [terminal] *apparatus* 105. Once the block limits are designated and sent, the railway traffic control [terminal] *apparatus* 105 [established office] *establishes* interlocking immediately in S1202. That is, the railway traffic control [terminal] *apparatus* 105 immediately sends a signal to the corresponding interlocks corresponding to the section of track designated to be blocked. Additionally, the railway traffic control [terminal] *apparatus* 105 generates and saves a random secret code in S1203.

After a request to block a certain section of track is sent, the railway traffic control [terminal] *apparatus* 105 checks if there is one or more of the sections *that* currently has a block placed, as shown in S1204. If one or more of the designated sections does not have a block placed, then the railway traffic control [terminal] *apparatus* 105 opens a user interface for the railway traffic controller to designate a type of block to set and a maintenance worker for the blocked section in S1206. If the railway traffic control terminal sees that a block is already in effect (S1205), then the railway traffic control [terminal] *apparatus* 105 allows the railway traffic controller to change the existing block type and maintenance worker using the same interface. The interface is then opened in S1206.

The railway traffic controller then inputs the type of block and assigns a worker to work on the blocked section. The railway traffic controller also has the option to block the track for purposes of an emergency and not necessarily for maintenance work in S1207. Once the railway traffic controller assigns a block type and/or a corresponding maintenance worker, the railway traffic control [terminal] *apparatus* 105 checks the status of the selected block in S1208. If the current selected section has an existing block, the railway traffic control [terminal] *apparatus* 105 waits for a response from the interlocks of the corresponding section to send an indication that a new block can be established in S1209. Once this indication is received in S1210, the railway traffic control [terminal] *apparatus* 105 enables the place button of the user interface (S1211). If the selected section has no previous active block, the railway traffic control [terminal] *apparatus* 105 immediately enables the place button on the user interface.

Once the place button is selected, the railway traffic control [terminal] *apparatus* 105 generates a place time and enables safety measures so that the block cannot be removed without the input of the secret code generated (S1212). Finally, the railway traffic control [terminal] *apparatus* 105 sends the secret removal code to the corresponding one or more maintenance workers (*S1213*) if the railway traffic controller has selected maintenance workers for the given block.

Figure 13:
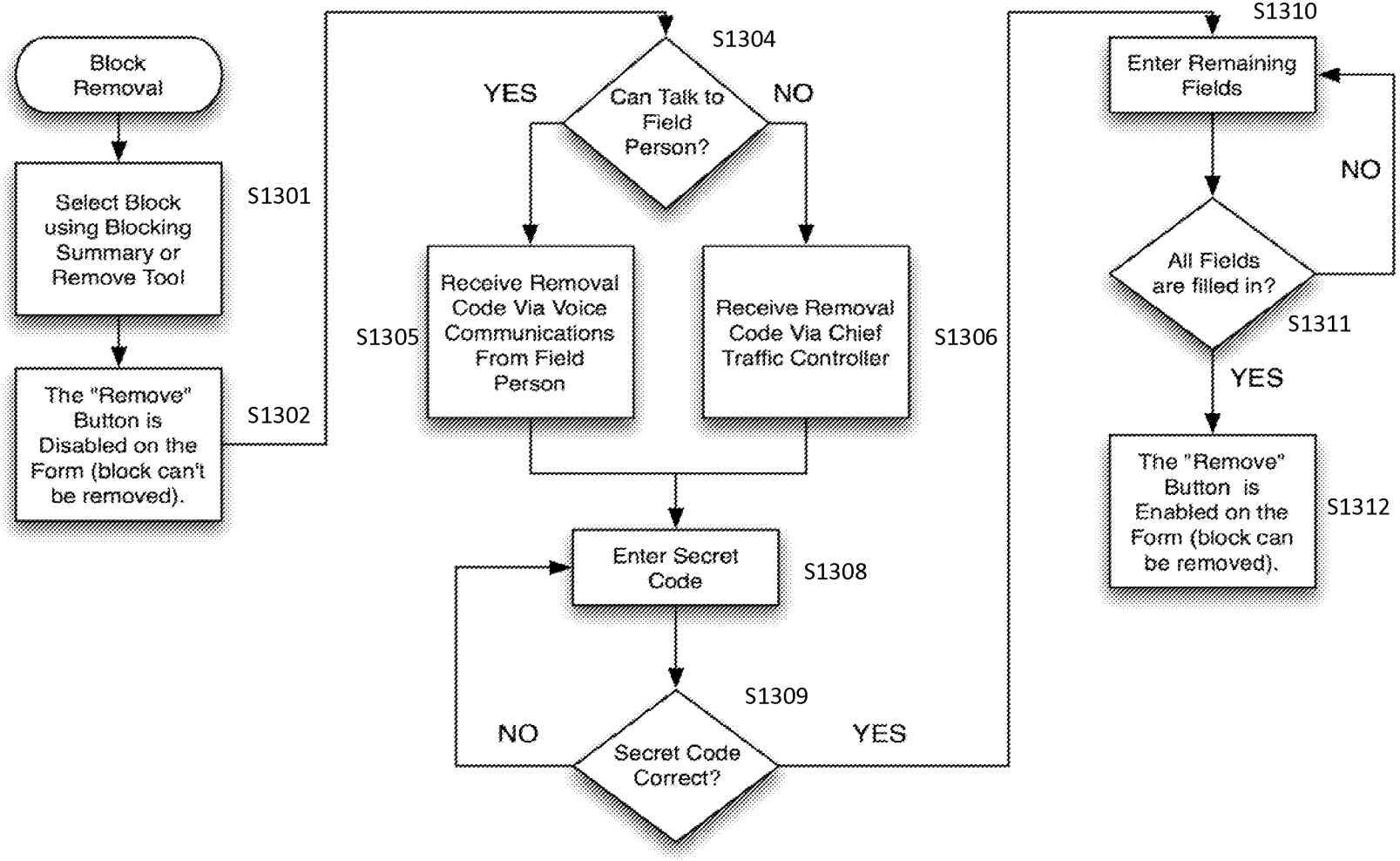
FIG. 13 shows a flow chart illustrating a block removal method, in accordance with an exemplary embodiment.

FIG. 13 describes a method for removing a block placed on a section of track. In S1301, the railway traffic controller selects an existing block by using either the network rail map, shown in FIG. 5, the remove tool, shown in FIGS. 6, 8 and 9, or the summary table, shown in FIG. 7. The remove button is disabled without the input of the secret code from either the maintenance worker or the railway traffic control [terminal] *apparatus* 105 (S1302). In S1304, the railway traffic control [terminal] *apparatus* 105 checks if there is a maintenance worker that is eligible to transmit the random secret code. If there is an eligible maintenance worker available (S1304, YES), the maintenance worker transmits the random secret code to the railway traffic control [center] *apparatus* 105 (S1305). If there is no maintenance worker available to transmit the random secret code (S1304, NO), the code can be retrieved from the train traffic control [terminal] *apparatus* 105 by the train traffic controller (S1306).

Once the secret code is received, the secret code may be input to the designated field in S1308. The railway traffic control [terminal] *apparatus* 105 checks the secret code with the code saved in its memory in S1309. If the code is incorrect[,] (S1309, NO), the railway traffic control [terminal] *apparatus* 105 will prompt the user to input the code again (S1308). If the code is correct (S1309, YES), the railway traffic control [terminal] *apparatus* 105 will prompt the user to enter information into any remaining fields in S1310. In S1311, the railway traffic control [terminal] *apparatus* 105 checks that all information input into all fields is correct and that all fields are filled in. After this check is performed by the railway traffic control [terminal] *apparatus*

105, the remove button is enabled on the form (S1312) and the railway traffic controller may remove the block on the corresponding track section.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

The orders in which the steps are performed in the aforementioned methods are not limited to those shown in the examples of FIGS. 12 and 13, and may be switched as long as similar results are achieved. Also, it should be noted that the methods illustrated in the examples of FIGS. 12 and 13 may be implemented using any of the embodiments shown in FIGS. 1A-1B.

Further, conventional systems can be modified to include the aspects described herein. As an example, a means may be added to a conventional interlock system by which the railway worker has partial control of the interlock system at the times that maintenance work is needed on a certain train block. In such modification, a system, apparatus and/or method may be provided to control the interlocks in a railway system as an interface between the railway workers and the interlock control. Thus, in a case in which maintenance is to be performed on a certain rail block, which is controlled by an interlock, the interlock can be configured to send out a stop signal for all incoming trains, to block train traffic to such portion of the rail system. In addition, once the interlock is placed in a "stop traffic" state, a release code is transmitted to an electronic contact address corresponding to the railway worker.

Once a block has been placed, the interlock remains in a blocked state, until the maintenance worker supplies the release code, which was received at the time the interlock started, and the release code is entered in the interlock control system. So long as the block is in place, the maintenance worker can perform on-track work, without interference of oncoming train traffic. After the maintenance worker finishes the assigned work and is clear of the train tracks, he/she may then supply the interlock control system with the release code, and the interlock control system in turn can release the interlock over the block.

Accordingly, the railway worker has more control over the traffic through the rail block in which the worker is working, and fatal on-track accidents can be reduced.

Additional variations may be apparent to one of ordinary skill in the art from reading U.S. Provisional Application No. 61/893,547, filed Oct. 21, 2013 and entitled "SYSTEM, APPARATUS AND METHOD FOR RAILWAY TRAFFIC CONTROL", the entire contents of which are incorporated herein by reference.

What is claimed is:

[1. A centralized railway control system comprising:

a rail personnel contact database registering, for each railway personnel, an electronic contact address of the railway personnel; and a railway traffic control apparatus for controlling access to railway tracks, said railway traffic control apparatus comprising a processor, a non-transitory medium storing one or more programs of executable instructions, and a network interface through which the railway traffic control apparatus communicates via a network with a user terminal, wherein execution of said one or more programs of executable instructions configures the processor to include:

a block placing part to place a block on one or more specified track sections to permit a railway field worker to enter the track sections while blocking railway traffic to said track sections;

a code generation part to generate a removal code, retrieve the electronic contact address of the railway field worker from the rail personnel contact database, and transmit the removal code to the electronic contact address of the railway field worker; and a block removal part to remove only upon entry of the removal code, the block placed by the block placing part on said one or more track sections.]

[2. The centralized railway control system of claim 1, wherein the railway traffic control apparatus further comprises:

a RTC user interface to permit a user to specify said one or more track sections to be blocked, specify an instruction to the centralized railway control system to block the railway traffic to the specified track sections, and specify identifying information of the railway field worker to be performing work in the specified track sections.]

[3. The centralized railway control system of claim 1, further comprising:

a railway control database registering block identifying information, including block limits identifying the one or more blocked track sections, along with the removal code for removing the block of the track sections.]

[4. The centralized railway control system of claim 1, further comprising:

a railway control database registering (a) identification of the user who specified the instruction to block the track sections and (b) block identifying information, including block limits identifying the one or more blocked track sections, notes specifying reasons for the block, and date and time at which the block was placed.]

[5. The centralized railway control system of claim 1, wherein upon placement by the block placing part of the block of railway traffic to said one or more specified track sections, the code generation part transmits the removal code to the electronic contact address of the railway field worker, and the block of railway traffic to said one or more specified track sections remains in place in the centralized railway control system until the entry of the removal code in the centralized railway control system to cause the block removal part to remove the block on said one or more track sections.]

[6. The centralized railway control system of claim 1, wherein the railway traffic control apparatus further comprises:

a block removal user interface to permit a user to enter the removal code to cause the block removal part to remove the block on said one or more track sections, wherein the block of railway traffic to said one or more specified track sections remains in place in the centralized railway control system until the entry of the removal code through the block removal user interface.]

[7. The centralized railway control system of claim 6, wherein the block removal user interface further requires, in addition to the entry of the removal code, the user to specify that confirmation that the track sections have been cleared has been obtained from the railway field worker associated with the block, before the block removal user interface permits the removal code to be transmitted to the block removal part, and the centralized railway control system further comprises a railway control database registering (a) block identifying information identifying the one or more blocked track sections, date and time at which the block was placed and identifying information the railway field worker associated with the block, and (b) block removal information identifying date and time at which the block was removed and identifying the user who entered the removal code and specified that confirmation that the track sections have been cleared was obtained from the railway field worker associated with the block.]

[8. The centralized railway control system of claim 1, further comprising:

a voice processing part configured to receive a voice message and extract the removal code from the voice message.]

[9. The centralized railway control system of claim 1, wherein the code generation part transmits an electronic message to the electronic contact address of the railway field worker, and the electronic message transmitted to the electronic contact address of the railway field worker includes the removal code and includes an embedded link for activating a return transmission of the removal code to the block removal part of the centralized railway control system.]

[10. A railway traffic control apparatus for controlling access to railway tracks, said railway traffic control apparatus comprising:

a block placing part to place a block on one or more selected track sections to permit a railway field worker to enter the track sections while blocking railway traffic to said track sections;

a code generation part to generate a removal code, determine an electronic contact address of the railway field worker by accessing a rail personnel contact database registering, for each railway personnel, electronic contact information of the railway personnel, and transmit the removal code to the electronic contact address of the railway field worker; and a block removal part to remove only upon entry of the removal code, the block placed by the block placing part on said one or more track sections for the railway field worker.]

[11. The railway traffic control apparatus of claim 10, further comprising:

a RTC user interface to permit a user to specify said one or more track sections to be blocked, specify an instruction to the centralized railway control system to block the railway traffic to the specified track sections, and specify identifying information of the railway field worker to be performing work in the specified track sections.]

[12. The railway traffic control apparatus of claim 10, wherein block identifying information, including block limits identifying the one or more blocked track sections, is registered in a railway control database, along with the removal code for removing the block of the track sections.]

[13. The railway traffic control apparatus of claim 10, wherein block identifying information, including block limits identifying the one or more blocked track sections, notes specifying reasons for the block, and date and time at which the block was placed, are registered in a railway control database, along with identification of the user who specified the instruction to block the track sections.]

[14. The railway traffic control apparatus of claim 10, wherein upon placement by the block placing part of the block of railway traffic to said one or more specified track sections, the code generation code transmits the removal code to the electronic contact address of the railway field worker, and the block of railway traffic to said one or more specified track sections remains in place in the centralized railway control system until the entry of the removal code in the centralized railway control system to cause the block removal part to remove the block on said one or more track sections.]

[15. The railway traffic control apparatus of claim 10, further comprising:

a block removal user interface to permit a user to enter the removal code to cause the block removal part to remove the block on said one or more track sections, wherein the block of railway traffic to said one or more specified track sections remains in place in the centralized railway control system until the entry of the removal code through the block removal user interface.]

[16. The railway traffic control apparatus of claim 15, wherein the block removal user interface further requires, in addition to the entry of the removal code, the user to specify that confirmation that the track sections have been cleared has been obtained from the railway field worker associated with the block, before the block removal user interface permits the removal code to be transmitted to the block removal part, and block identifying information identifying the one or more blocked track sections, date and time at which the block was placed and identifying information the railway field worker associated with the block is registered in a railway control database, along with block removal information identifying date and time at which the block was removed and identifying the user who entered the removal code and specified that confirmation that the track sections have been cleared was obtained from the railway field worker associated with the block.]

[17. The railway traffic control apparatus of claim 10, further comprising:

a voice processing part configured to receive a voice message and extract the removal code from the voice message.]

[18. The railway traffic control apparatus of claim 10, wherein the code generation part transmits an electronic message to the electronic contact address of the railway field worker, and the electronic message transmitted to the electronic contact address of the railway field worker includes the removal code and includes an embedded link for activating a return transmission of the removal code to the block removal part of the centralized railway control system.]

[19. A method for a centralized railway control system to control access to railway tracks, the method comprising:

providing a user interface on a user terminal including a block placing part to place a block on one or more specified track sections to permit a railway field worker to enter the track sections while blocking railway traffic to said track sections;

generating a removal code, determining an electronic contact address of the railway field worker by accessing a rail personnel contact database registering, for each railway personnel, electronic contact information of the railway personnel, and transmitting the removal code to the electronic contact address of the railway field worker; and permitting the block to said one or more track sections to be removed only upon entry of the removal code in the centralized railway control system.]

*20. A railway control apparatus comprising:*

*a processor for controlling a plurality of track sections in a centrally controlled railway network; and*

*a memory device storing computer-executable instructions, wherein execution of the computer-executable instructions by the processor causes the railway control apparatus to:*

*receive a selection of at least one track section in the centrally controlled railway network, wherein each track section is associated with a corresponding interlock;*

*responsive, at least in part, to receiving the selection of the at least one track section, transmit a block signal to the corresponding interlock of the at least one selected track section to place a block on the at least one selected track section;*

*generate a first secret code associated with the at least one selected track section;*

*store the first secret code in the memory device of the railway control apparatus;*

*transmit the first secret code to a remote user terminal;*

*receive a second secret code;*

*determine that the second secret code and the first secret code stored in the memory device are the same; and*

*responsive to determining that the second secret code and the first secret code stored in the memory device are the same, release the block on the at least one selected track section.*

*21. The railway control apparatus of claim 20, wherein only the railway control apparatus and the remote user terminal receive the first secret code.*

*22. The railway control apparatus of claim 20, wherein the execution of the computer-executable instructions by the processor further causes the railway control apparatus to:*

*retrieve specific personnel data from a rail personnel database; and*

*determine an electronic address of the remote user terminal to which the first secret code is to be transmitted.*

*23. A method comprising:*

*receiving, by a processor of a railway control apparatus, a selection of at least one track section in a centrally controlled railway network, wherein each track section corresponds to an interlock;*

*responsive to receiving the selection of the at least one track section, transmitting by the processor, a block signal to the corresponding interlock of the at least one selected track section to place a block on the at least one selected track section;*

*generating, by the processor, a first secret code associated with the at least one selected track section;*

*storing the first secret code in a memory device of the railway control apparatus;*

*transmitting, by the processor, the first secret code to a remote user terminal;*

*receiving, by the processor, a second secret code;*

*determining, by the processor, that the second secret code and the first secret code stored in the memory device are the same; and*

*responsive to determining that the second secret code and the first secret code stored in the memory device are the same, releasing, by the processor, the block on the at least one selected track section.*

*24. The method of claim 23, wherein only the railway control apparatus and the remote user terminal receive the first secret code.*

*25. The method of claim 23, further comprising:*

*retrieving, by the processor, specific personnel data from a rail personnel database; and*

*determining, by the processor, an electronic address of the remote user terminal to which the first secret code is to be transmitted.*

* * * * *